UNITED STATES PATENT OFFICE.

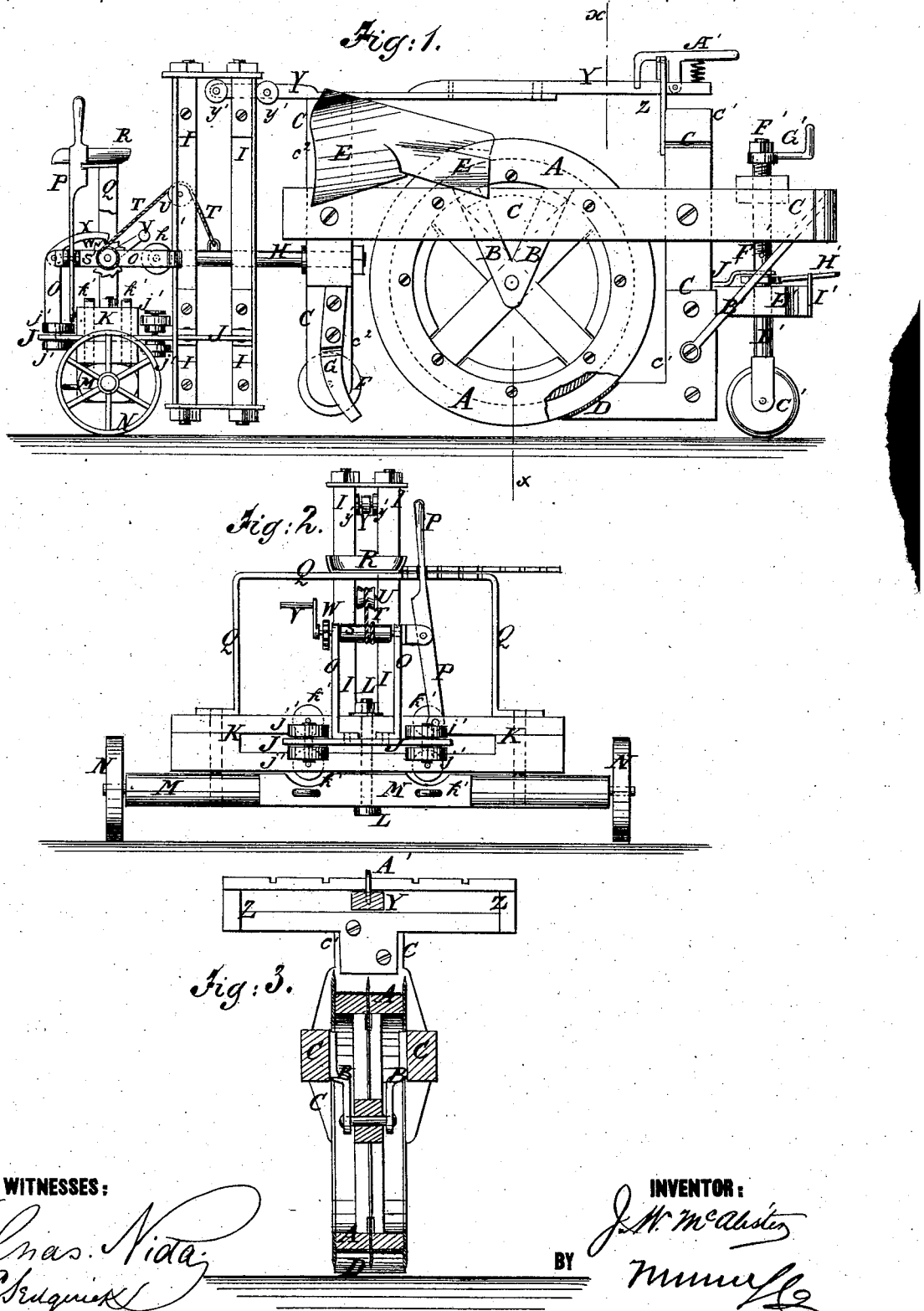

JORDAN W. McALISTER, OF WOODSON, ILLINOIS.

IMPROVEMENT IN DITCHING-MACHINES.

Specification forming part of Letters Patent No. 155,250, dated September 22, 1874; application filed July 3, 1874.

*To all whom it may concern:*

Be it known that I, JORDAN W. MCALISTER, of Woodson, in the county of Morgan and State of Illinois, have invented a new and useful Improvement in Ditching-Machines, of which the following is a specification:

Figure 1 is a side view of my improved machine. Fig. 2 is a front view of the same. Fig. 3 is a detail cross-section of the same, taken through the line $x\ x$, Fig. 1.

Similar letters of reference indicate corresponding parts.

My invention has for its object to furnish an improved machine for opening ditches, which shall be simple in construction, conveniently guided and controlled, and effective in operation.

The invention will first be fully described, and then pointed out in the claims.

A is the ditching-wheel, which is made with three or more flanges upon its face. The central flange is attached to the center of the outer ends of the spokes. The tires are then put on, and afterward the side flanges. This construction leaves the face of the wheel entirely smooth, so that the plows or scrapers will encounter no obstructions in removing the soil from said wheel. The wheel A is pivoted to and between the V-shaped bars or brackets B, which are attached to the side bars of the frame C. To the lower end of the rear vertical bar $c^1$ of the frame C is attached the plow D, by which a slice of soil from the bottom of the ditch is separated from the soil below it, and packed into the space between the flanges of the wheel A, which flanges are forced down into the soil by the weight of the wheel A, and of the frame B and its attachments, so that the soil may be carried up to the upper part of the wheel A, where it is removed by the plows or scrapers E, which are attached to the upper forward part of the frame B, and are so formed as to remove the soil from the wheel A, and guide it to the sides of the ditch. The plows or scrapers E are designed to be made of metal, and lined with glass to prevent the soil from sticking to them, and to diminish the friction as the soil slides back upon them. To the lower end of the front vertical bar $c^2$ of the frame C is pivoted a roller, F, which rolls along the bottom of the ditch in front of the flanged wheel A. To the sides of the lower end of the bar $c^2$ are attached knives G, which shave off the sides of the ditch, and widen it, so that the wheel A may work freely in it. In bearings in the front vertical bar $c^2$ of the frame C works the rear end of the draft or coupling shaft H, the forward part of which passes between the four vertical posts of the frame I, and has small friction-wheels $h'$ pivoted to the sides of its forward end, which rest against the forward posts of the frame I, and sustain the draft. The posts of the frame I are made of angle-iron, and their upper and lower ends are bolted to plates, by which they are held in position. To the frame I, a little above its lower end, is bolted a horizontal plate, J, which is slotted to correspond with the space between the posts of the frame I, so that the shaft H may not be obstructed in its up-and-down movement. The forward part of the plate J passes through a slot in the bolster K, and has four pairs of friction-wheels, $j'$, pivoted to it, which rest against the front and rear sides of the said bolster K. The plate J is connected with the bolster K by the king-bolt L, which passes through a slot in the said plate J, so that the plate J and vertical frame I may be moved laterally, to keep the ditching-wheel A in line with the ditch should the bolster K, axle M, and wheel N deviate from said line. The friction of the plate J, as it moves in the slot of the bolster K, is lessened by eight small friction rollers or wheels, $k'$, pivoted to its upper and lower parts, the faces of which rest against the upper and lower sides of the said plate J. To the forward end of the plate J, and to the forward posts of the frame I, is attached a small angular frame, O, to a support attached to which is pivoted a lever, P, the lower end of which is pivoted to the bolster K. The upper end of the lever P projects across the notched top bar of the frame Q, into such a position as to be readily reached and operated by the driver from his seat R, attached to the top bar of the frame Q. The frame Q is rigidly attached to the bolster K. To the angular frame O is pivoted a shaft, S, to which is attached one end of a rope or chain, T, which passes over a guide-pulley, U, pivoted to and between the upper part of the forward posts of the frame I. The other end of the rope or chain T is attached to the shaft H, so that, by turning the said shaft S, the ditching-wheel A may be raised from the ground for passing out of and into the ditch, for turning, and for passing from place to place. The shaft S is turned to wind up and unwind the rope or chain T by a hand-wheel or crank, V, attached to one of its ends, and is held in any position into which it may be turned by a ratchet-wheel, W, attached to it, and a pawl, X, pivoted to the angular frame O. To the upper end of the front vertical bar $c^2$ of the frame C is pivoted a lever, Y, the forward end of which passes between the rear posts of the frame I, and has four small wheels or rollers, $y'$, pivoted to its side, which rest against the front and rear sides of the said rear posts of the frame I, so that the lever Y may move up and down with the frame C and shaft H. The rear end of the lever Y passes through a longitudinal slot in the horizontal bar Z, and is provided with a spring lever-pawl, A', which enters notches formed in the bar Z, so that the said lever may be held securely in any position into which it may be moved. The lever Y enables the ditching-wheel A and its frame C to be inclined to one or the other side to keep them vertical should the surface of the ground, and consequently the bolster K, plate J, and frame I, be inclined. The draft-strain upon the rear vertical bar $c^1$ of the frame C, with the lower end of which the plow D is connected, is supported by the brace-bars B', the lower ends of which are attached to the sides of the lower part of the said vertical bar $c^1$. The other ends of the braces B' have screw-threads cut upon them, pass through a cross-bar attached to the rear ends of the side bars of the frame C, and have nuts screwed upon them, so that the tension of the said braces may be regulated as required. The rear end of the frame C is supported by a small wheel, C', the standard D' of which passes up through the guide-arm E', attached to the rear vertical bar $c^1$ of the frame C, and its upper end is swiveled to the lower end of the screw F', which passes up through a cross-bar or nut attached to the rear part of the side bars of the frame C, and has a hand-wheel or crank, G', attached to its upper end, so that by turning the said screw in one direction the wheel C' may be raised from the ground when the machine is at work, so that the whole weight of the wheel A and frame C may rest upon the said wheel A to hold it down to its work. By turning the screw F' in the other direction the wheel C' will be lowered to support the wheel A away from the ground when passing into and out of the ditch, turning, and passing from place to place. To the upper part of the standard D' is attached a lever, H', by which the standard D' and wheel C' may be turned to guide the machine. The lever H' rests upon a plate, I', attached to the rear end of the arm E', and which has a notch formed in it to receive and hold the said lever H' when the wheel C' is in line with the ditching-wheel A. The lever H' is held down upon the plate I' by a spring, J', attached to the arm E'.

This construction enables the machine to be conveniently guided in turning and passing from place to place.

If desired, a series of holes may be formed in the rear posts of the frame I, extending from their lower end up to the point where the shaft H stands when the machine stands upon the surface of the ground and the ditching-wheel A is lowered into working position. These holes are designed to receive a pin which is passed through them above the shaft H, to hold the ditching-wheel down to its work, and prevent it from being forced upward by the pressure of the ground.

Having thus described my invention, I claim as new and desire to secure by Letters Patent—

1. The upright frame I, the slotted plate J, and the draw-shaft H, in combination with each other, with the slotted bolster K, and with the frame C, that carries the ditching-wheel A, substantially as herein shown and described.

2. The combination of the rope or chain T, the guide-pulley U, and the shaft S with the draw-shaft H, the vertical frame I, and the slotted plate J, substantially as herein shown and described.

3. The combination of the lever P with the slotted bolster K and the slotted plate J, that carries the upright frame I, substantially as herein shown and described.

4. The combination of the pivoted lever Y with the frame C, that carries the ditching-wheel A, and with the upright frame I, substantially as herein shown and described.

JORDAN W. McALISTER.

Witnesses:
 HENRY C. BISHOP,
 SMITH BALL.